United States Patent
Elterman

(10) Patent No.: US 10,155,424 B1
(45) Date of Patent: Dec. 18, 2018

(54) CONTROL ARM WITH AN IMPROVED BUSHING AND METHOD OF MAKING

(71) Applicant: Federal-Mogul Motorparts Corporation, Southfield, MI (US)

(72) Inventor: James Elterman, Byrnes, MO (US)

(73) Assignee: Federal-Mogul Motorparts Corporation, Southfield, MI (US)

(*) Notice: Subject to any disclaimer, the term of this patent is extended or adjusted under 35 U.S.C. 154(b) by 0 days.

(21) Appl. No.: 15/629,875

(22) Filed: Jun. 22, 2017

(51) Int. Cl.
  *B60G 9/02* (2006.01)
  *B60G 7/00* (2006.01)

(52) U.S. Cl.
  CPC ........ *B60G 7/001* (2013.01); *B60G 2204/143* (2013.01); *B60G 2204/41* (2013.01)

(58) Field of Classification Search
  CPC ........ F16C 35/02; F16C 27/063; F16C 17/10; F16F 1/3828; F16F 1/3842
  USPC ................. 280/124.127, 124.13, 124.134
  See application file for complete search history.

(56) References Cited

U.S. PATENT DOCUMENTS

| | | | |
|---|---|---|---|
| 3,194,614 A | 7/1965 | Thomas | |
| 3,383,143 A | 5/1968 | Schmidt | |
| 4,685,184 A * | 8/1987 | Satkamp | B23P 15/003 29/447 |
| 4,809,960 A * | 3/1989 | Kakimoto | B60G 7/00 248/634 |
| 5,035,681 A | 7/1991 | Hertel et al. | |
| 5,058,867 A * | 10/1991 | Hadano | B60G 7/005 248/635 |
| 5,143,457 A | 9/1992 | Langhof et al. | |
| 5,165,803 A * | 11/1992 | Zivkovic | B60G 7/02 384/140 |
| 5,275,429 A | 1/1994 | Bunker | |
| 5,286,014 A * | 2/1994 | Chakko | B60G 7/00 267/141.2 |
| 5,439,203 A | 8/1995 | Hadano | |
| 5,593,233 A | 1/1997 | Kammel et al. | |
| 5,820,115 A | 10/1998 | Stevenson et al. | |
| 6,237,903 B1 | 5/2001 | Novak et al. | |
| 6,619,639 B1 | 9/2003 | Shelley et al. | |

(Continued)

FOREIGN PATENT DOCUMENTS

| | | |
|---|---|---|
| DE | 2229663 A1 | 1/1974 |
| GB | 1428205 A | 3/1976 |

(Continued)

OTHER PUBLICATIONS

International Search Report, dated Oct. 2, 2018 (PCT/US2018/037676).

*Primary Examiner* — Toan C To
(74) *Attorney, Agent, or Firm* — Robert L. Stearns; Dickinson Wright, PLLC

(57) ABSTRACT

The control arm assembly includes a control arm body that has at least one opening which extends along a horizontally extending axis. A bushing assembly is received in the at least one opening of the control arm body. The bushing assembly includes at least one ring that is made of an elastomeric material and that has an inner surface which defines an inner bore that extends along an axis between opposite open ends. A tube extends through the inner bore of the at least one elastomeric ring. At least one liner made of a low friction fabric material is fixedly attached with the inner surface for allowing free rotation of the tube relative to the at least one ring.

16 Claims, 3 Drawing Sheets

(56) References Cited

U.S. PATENT DOCUMENTS

| | | | | |
|---|---|---|---|---|
| 6,702,467 | B2 * | 3/2004 | Testroet | B60G 7/02 384/222 |
| 7,207,583 | B2 * | 4/2007 | Ross | B60G 7/02 267/270 |
| 7,325,796 | B2 | 2/2008 | Moreland | |
| 7,506,862 | B2 * | 3/2009 | Siemer | B60G 7/02 267/141 |
| 8,292,312 | B2 * | 10/2012 | Kato | B60G 21/0551 267/141.1 |
| 8,424,891 | B2 * | 4/2013 | Nagai | F16F 1/16 280/124.107 |
| 9,797,443 | B2 * | 10/2017 | Spinella | F16C 35/02 |
| 2005/0056983 | A1 | 3/2005 | Spinella | |
| 2008/0006061 | A1 | 1/2008 | James | |
| 2014/0210173 | A1 | 7/2014 | Conaway et al. | |
| 2016/0084302 | A1 | 3/2016 | Spinella | |

FOREIGN PATENT DOCUMENTS

| | | |
|---|---|---|
| WO | 0138113 A1 | 5/2001 |
| WO | 2014116552 A2 | 7/2014 |
| WO | 2008005785 A2 | 6/2017 |

* cited by examiner

CONTROL ARM WITH AN IMPROVED BUSHING AND METHOD OF MAKING

BACKGROUND OF THE INVENTION

1. Field of the Invention

The present invention is related generally to vehicle suspensions and, more particularly, to control arms with bushing assemblies.

2. Related Art

In many vehicle suspensions, one or two control arms are provided and are rotatably attached with a vehicle frame for allowing a wheel to translate up and down when the wheel encounters an obstacle or when the vehicle is cornering at speed. Each control arm is connected to the vehicle frame with one or more bushings which may be either horizontally or vertically oriented. Horizontal bushings typically include a rubber body which flexes to absorb impact forces and a metal tube which receives a fastener that extends through the bushing to connect the bushing and control arm with the vehicle frame.

In some cases, such as vehicles with a high suspension travel and a short control arm length, the rubber body can fatigue quickly due to strain on the rubber, which necessitates replacement of the horizontal bushing.

SUMMARY OF THE INVENTION

One aspect of the present invention is related to a control arm assembly for a vehicle suspension system. The control arm assembly includes a control arm body that has at least one opening which extends along a horizontally extending axis. A bushing assembly is received in the at least one opening of the control arm body. The bushing assembly includes at least one ring that is made of an elastomeric material and that has an inner surface which defines an inner bore that extends along an axis between opposite open ends. A tube extends through the inner bore of the at least one elastomeric ring. At least one liner made of a low friction fabric material is fixedly attached with the inner surface for allowing free rotation of the tube relative to the at least one ring.

The fabric liner allows the control arm body to rotate relative to the frame with little or no strain on the at least one elastomeric ring while still allowing the at least one elastomeric ring to cushion any radial forces between the control arm body and the frame. The bushing assembly thus has an improved operating life compared to other known bushing devices. The bushing can also be made at a low cost and installed in the vehicle suspension quickly and easily.

According to another aspect of the present invention, the at least one liner is made of a polyester yarn that is woven or knitted with polytetrafluoroethylene (PTFE).

According to yet another aspect of the present invention, the bushing assembly further includes a pair of washers that have annular shapes that are disposed at opposite axial ends of the at least one ring.

According to still another aspect of the present invention, the washers are made of nylon.

According to a further aspect of the present invention, the elastomeric material of the at least one ring is rubber.

According to yet a further aspect of the present invention, a fastener extends through the tube for attaching the bushing assembly with a frame of a vehicle.

According to still a further aspect of the present invention, the at least one ring is further defined as a pair of rings.

According to another aspect of the present invention, each of the rings has an axial portion which extends into the opening of the control arm body and has a flange portion which extends radially outwardly and is in contact with an outer face of the control arm body.

According to yet another aspect of the present invention, the axial portions of the rings contact one another.

Another aspect of the present invention is a method of making a control arm for a vehicle suspension assembly. The method includes the step of preparing at least one elastomeric ring that is made of a rubber material and which has an inner surface that surrounds an open bore. The method continues with the step of bonding at least one fabric sleeve, which is made of a low friction material, with the inner surface of the at least one elastomeric ring. The method proceeds with the step of inserting the at least one elastomeric ring into one end of an opening of a control arm body. The method proceeds with the step of inserting a tube through the open bore of the at least one elastomeric ring such that the tube is in surface-to-surface and slidable contact with the at least one fabric sleeve.

According to another aspect of the present invention, the at least one elastomeric ring is a pair of elastomeric rings, and the method further includes the step of inserting a second elastomeric ring into the opening of the control arm body from an opposite direction from the at least one elastomeric ring.

According to yet another aspect of the present invention, the fabric sleeves are made of a polyester yarn that is woven or knitted with PTFE.

According to still another aspect of the present invention, the method further includes the step of inserting washers about the tube and onto opposite axial sides of the elastomeric rings.

According to a further aspect of the present invention, the washers are made of a low friction material.

According to yet a further aspect of the present invention, the method further includes the step of inserting a fastener through a pair of apertures in a vehicle frame, through the washers and through the tube to secure the control arm body with the vehicle frame.

According to still a further aspect of the present invention, each of the rings has an axial portion and a flange portion, and the steps of inserting the elastomeric rings into the opening of the control arm body includes contacting the flange portions of the elastomeric rings with outer faces of the control arm body.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
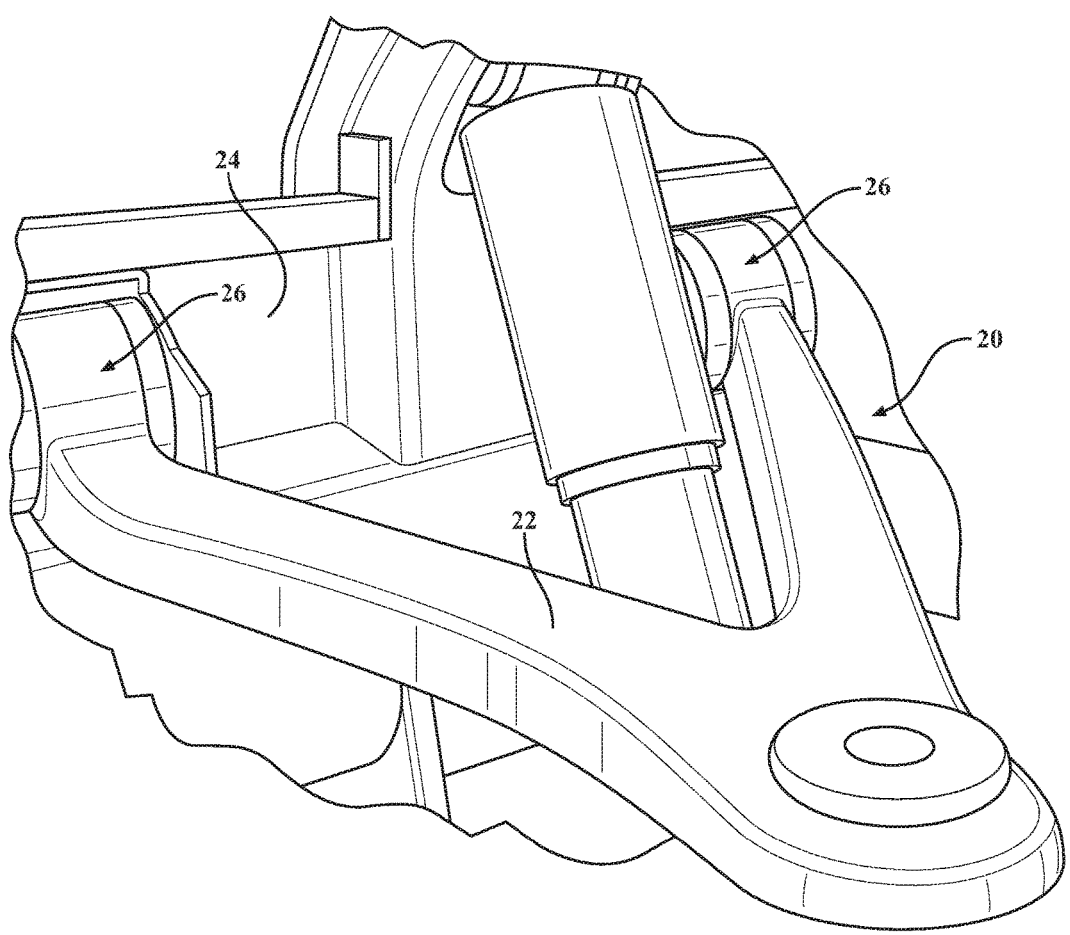
FIG. 1 is a perspective and fragmentary view of an exemplary embodiment of a suspension assembly which includes a control arm which is coupled with a vehicle frame via a pair of bushing assemblies.
Figure 2:
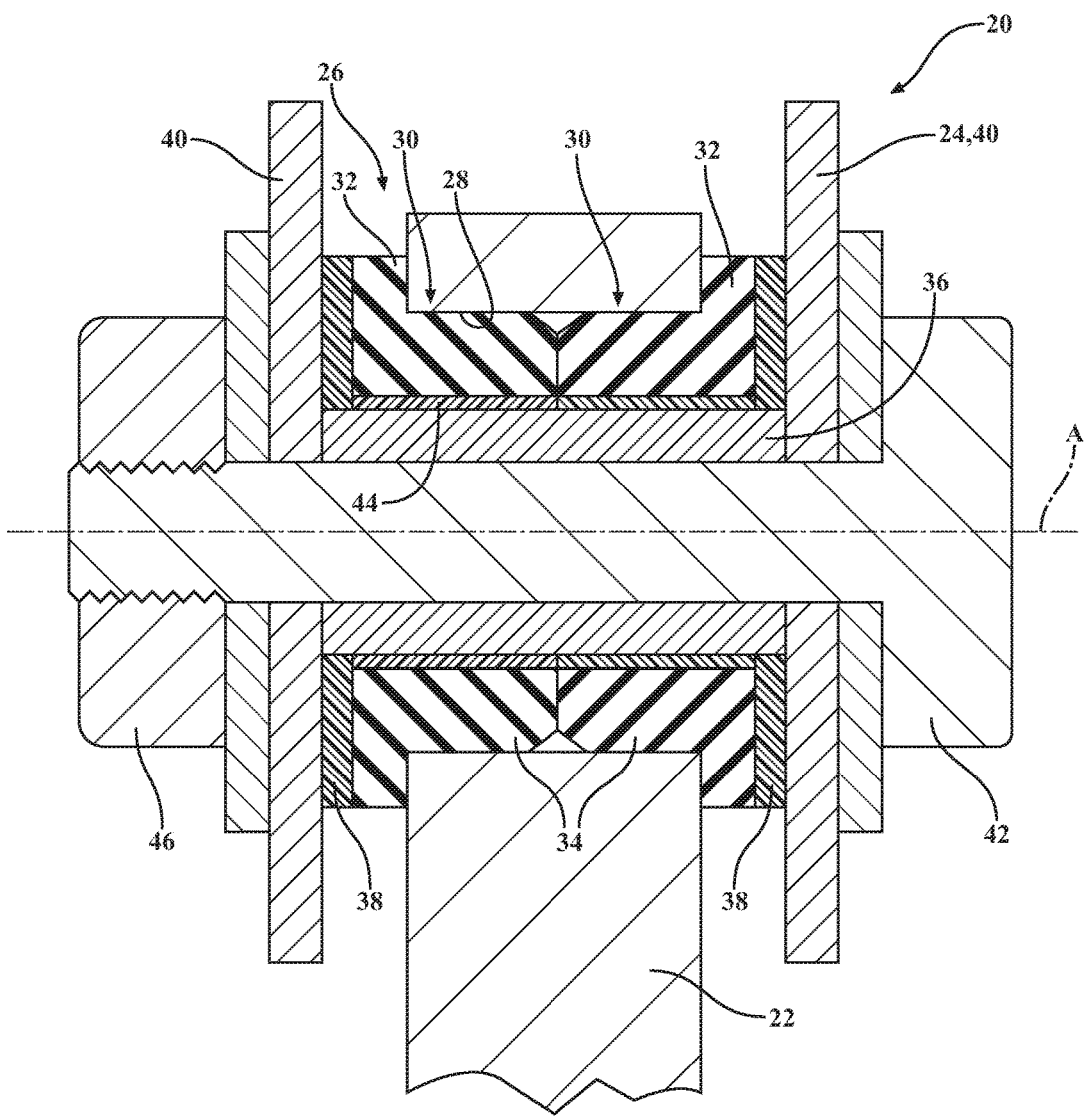
FIG. 2 is a cross-sectional view of an exemplary embodiment of the connection between the control arm and the frame with an exemplary embodiment of an improved bushing assembly.

Referring to the Figures, wherein like numerals indicate corresponding parts throughout the several views, a vehicle suspension system 20 with a control arm body 22 that is interconnected with a vehicle frame 24 via a pair of improved bushing assemblies 26 is generally shown in FIGS. 1 and 2. Each of the bushing assemblies 26 is oriented in a horizontal direction to allow the control arm body 22 to rotate about a horizontal axis A as a wheel attached thereto encounters an obstacle or when the vehicle is turning at speed. The improved bushing assemblies 26 also function to absorb, or cushion, radial forces that are transferred between the control arm body 22 and the vehicle frame 24 to improve the durability and operating life of the vehicle suspension assembly 20. In the exemplary embodiment, the control arm body 22 is an upper control arm of a double-wishbone type of suspension system. However, it should be appreciated that the improved bushing assembly 26 may find uses in any suitable type or shape of control arm that has at least one opening which extends along a horizontal axis A.

With reference to FIG. 2, the exemplary embodiment of the improved bushing assembly 26 is received in an opening 28 of the control arm body 22 and extends outwardly therefrom on opposite axial sides of the control arm body 22. The bushing assembly 26 includes a pair of elastomeric rings 30 that are made as separate pieces from one another and are of identical construction. Each elastomeric ring 30 has a flange portion 32 at a first axial end and an axial portion 34 which projects from the flange portion 32 to a second axial end. The axial portion 34 has an outer diameter which is similar to a diameter of the opening 28 of the control arm body 22, and the flange portion 32 has a greater diameter than the axial portion 34 such that the flange portion 32 extends radially outwardly from the axial portion 34. The flange portions 32 are in direct contact with opposing outer faces of the control arm body 22. The elastomeric rings 30 are preferably made of a rubber or rubber-like material and are preferably injection molded to their final shapes. The elastomeric rings 30 are identical in construction, which allows for manufacturing cost savings through economies of scale. During operation of the vehicle, the rubber or rubber-like material of the elastomeric rings 30 compress and stretches elastically to absorb, or cushion, radial forces that are transferred between the vehicle frame 24 and the control arm body 22.

The axial portions 34 of the elastomeric rings 30 are press-fit into the opening of the control arm body 22 from opposite axial directions until the second axial ends of the elastomeric rings 30 contact one another at an approximate axial midpoint of the opening 28. Each of the axial portions 34 has an outer surface which is in direct, surface-to-surface contact with an inner wall of the opening 28 of the control arm body 22 such that the elastomeric rings 30 remain fixed with the control arm body 22 as the control arm body 22 rotates relative to the frame 24. The second axial ends of the elastomeric rings 30 are chamfered to allow for easier insertion of the elastomeric rings 30 into the opening 28 of the control arm body 22.

Each of the elastomeric rings 30 also has an inner surface that defines an inner bore, and the inner bores are coaxially aligned with one another to present a passage which extends along the axis A between opposite open ends. A tube 36 is inserted into the passage defined by the elastomeric rings 30. The tube 36 also extends along the axis A between opposite open ends. The tube 36 is preferably made of a metal, such as steel, an alloy steel, aluminum or an aluminum alloy.

A pair of washers 38 are provided on opposite sides of the elastomeric rings 30 and are positioned between the flange portions 32 and a pair of mounting plates 40 of the vehicle frame 24 such that there is no direct contact between the elastomeric rings 30 and the vehicle frame 24. The washers 38 are made of a low friction material, such as nylon 6/6, glass-filled nylon 6/6 or acetal, to allow the elastomeric rings 30 to freely rotate relative to the vehicle frame 24 during operation of the vehicle. The distance between the outwardly facing surfaces of the washers 38 is approximately the same as the length of the tube 36, and this distance is slightly less than the distance between the mounting plates 40 of the vehicle frame 24 to allow the bushing assembly 26 and the control arm body 22 to be inserted into the gap between the mounting plates 40 as a pre-assembled unit.

A fastener 42, which is a bolt 42 in the exemplary embodiment, extends along the horizontal axis A through the tube 36 and is fixedly attached with the mounting plates 40 of the vehicle frame 24 on opposite axial sides of the bushing assembly 26. The bolt 42 is preferably tightened such that it remains fixed with the vehicle frame 24 as the control arm body 22 rotates about the horizontal axis A.

The inner surface of each of the elastomeric rings 30 is lined with a fabric liner 44 that is made of a low friction material, which is preferably a polyester yarn that is woven or knitted with polytetrafluoroethylene (PTFE), to provide a low friction interface between the elastomeric rings 30 and the tube 36. This low friction interface allows the elastomeric rings 30 to slide along the tube 36 as the control arm body 22 and the elastomeric rings 30 freely rotate about the horizontal axis A relative to the tube 36, the bolt 42, and the vehicle frame 24 without stressing the rubber material of the elastomeric rings 30. In the exemplary embodiment, the PTFE liners 44 are adhesively bonded with the inner surfaces of the elastomeric rings 30. This improves the operating life of the bushing assembly 26 by reducing fatigue in the elastomeric rings 30 as compared to ones where the rubber rings bonded to the tube such that the rubber material is stressed through stretching and compression as the control arm body rotates.

Figure 3:
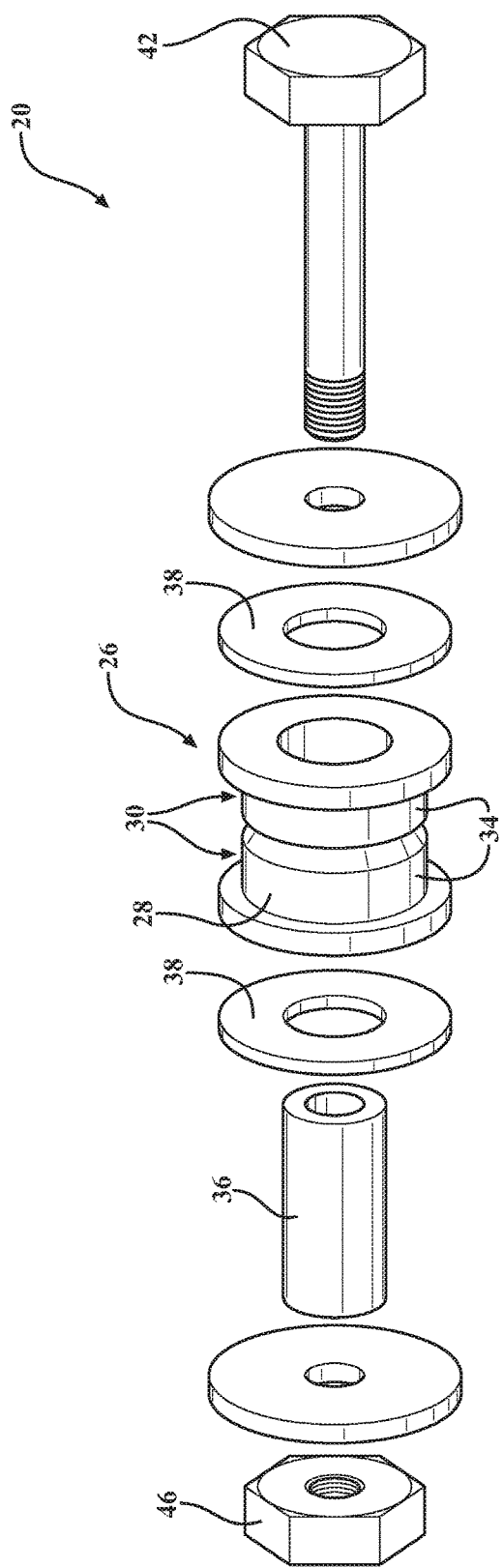
FIG. 3 is an exploded view of the exemplary embodiment of the improved bushing assembly.

Another aspect of the present invention is related to a method of making a control arm assembly for a vehicle suspension assembly 20 and attaching the control arm assembly to a vehicle frame 24 with an improved bushing assembly 26, such as the exemplary bushing assembly 26 discussed above and shown in FIGS. 2 and 3. The exemplary method includes the step of injection molding the elastomeric rings 30 out of a rubber or rubber-like material. The method continues with the step of bonding the PTFE liners 44 to the inner surfaces of the elastomeric rings 30. The method proceeds with the steps of inserting one of the elastomeric rings 30 into the opening 28 of the control arm body 22 from one axial direction and inserting the other of the elastomeric rings 30 into the opening 28 from an opposite axial direction. The method continues with the step of inserting a tube 36 through the passage of the elastomeric rings 30 such that the tube 36 is in surface-to-surface and slidable contact with the PTFE liners 44. The nylon washers 38 are then inserted onto the tube 36 on opposite axial sides of the elastomeric rings 30. To attach the control arm body 22 with the vehicle frame 24, the pre-assembled control arm body 22 and bushing assembly 26 are inserted into the space between the mounting plates 40, and the tube 36 of the bushing assembly 26 is aligned with apertures in the mounting plates 40. The bolt 42 is then inserted through the aligned apertures in the mounting plates 40 and through the tube 36 of the bushing assembly 26. A nut 46 is then threaded onto the end of the bolt 42 to fixedly attach the bolt 42 with the vehicle frame 24. The control arm body 22 can be detached from the vehicle frame 24 by simply removing the nut 46 and bolt 42 from the vehicle frame 24 and the bushing assembly 26.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A control arm assembly fir a vehicle suspension system, comprising:
    a control arm body that has at least one opening which extends along a horizontally extending axis; and
    a bushing assembly received in said opening, said bushing assembly comprising;
    at least one ring that is made of an elastomeric material and has an inner surface which defines an inner bore that extends along an axis between opposite open ends;
    a tube received in and extending through said inner bore of said at least one ring; and
    at least one liner made of a low friction fabric material and fixedly attached with said inner surface of said at least one ring and allowing free rotation of said tube relative to said at least one ring.

2. The control arm assembly as set forth in claim 1 wherein said at least one liner is made of a polyester yarn that is woven or knitted with polytetrafluoroethylene (PTFE).

3. The control arm assembly as set forth in claim 2 wherein said bushing assembly further includes a pair of washers that have annular shapes and that are disposed at opposite axial ends of said at least one ring.

4. The control arm assembly as set forth in claim 3 wherein said washers are made of nylon 6/6, glass-filled nylon 6/6 or acetal.

5. The control arm assembly as set forth in claim 1 wherein said elastomeric material of said at least one ring is a rubber.

6. The control arm assembly as set forth in claim 1 further including a fastener extending through said tube for attaching said bushing assembly with a frame of a vehicle.

7. The control arm assembly as set forth in claim 1 wherein said at least one ring of said bushing assembly is further defined as a pair of rings.

8. The control arm assembly as set forth in claim 7 wherein each of said rings has an axial portion which extends into said opening of said control arm body and has a flange portion which extends radially outwardly and is in contact with an outer face of said control arm body.

9. The control arm assembly as set forth in claim 8 wherein said axial portions of said rings contact one another.

10. A method of making a control arm for a vehicle suspension assembly, comprising the steps of:
    preparing at least one elastomeric ring that is made of a rubber material and which has an inner surface that surrounds an open bore;
    bonding at least one fabric sleeve that is made of a low friction material with the inner surface of the at least one elastomeric rings;
    inserting the at least one elastomeric ring into one end of an opening of a control arm body; and
    inserting a tube through the open bores of the at least one elastomeric ring such that the tube is in surface-to-surface and slidable contact with the at least one fabric sleeve.

11. The method as set forth in claim 10 wherein the at least one fabric sleeve is made of a polyester yarn that is woven or knitted with polytetrafluoroethylene (PTFE).

12. The method as set forth in claim 10 wherein the at least one elastomeric ring is further defined as a pair of elastomeric rings and further including the step of inserting a second elastomeric ring into an opposite end of the opening of the control arm body.

13. The method as set forth in claim 12 further including the step of inserting washers about the tube and on opposite axial sides of the elastomeric rings.

14. The method as set forth in claim 13 wherein the washers are made of nylon 6/6, glass-filled nylon 6/6 or acetal.

15. The method as set forth in claim 13 further including the step of inserting a fastener through a pair of apertures in a vehicle frame, through the washers, and through the tube to secure the control arm body with the vehicle frame.

16. The method as set forth in claim 11 wherein each of the elastomeric rings has an axial portion and a flange portion and wherein the steps of inserting the elastomeric rings into the opening of the control arm body include contacting the flange portions of the elastomeric rings with outer faces of the control arm body.

* * * * *